Figure 1:
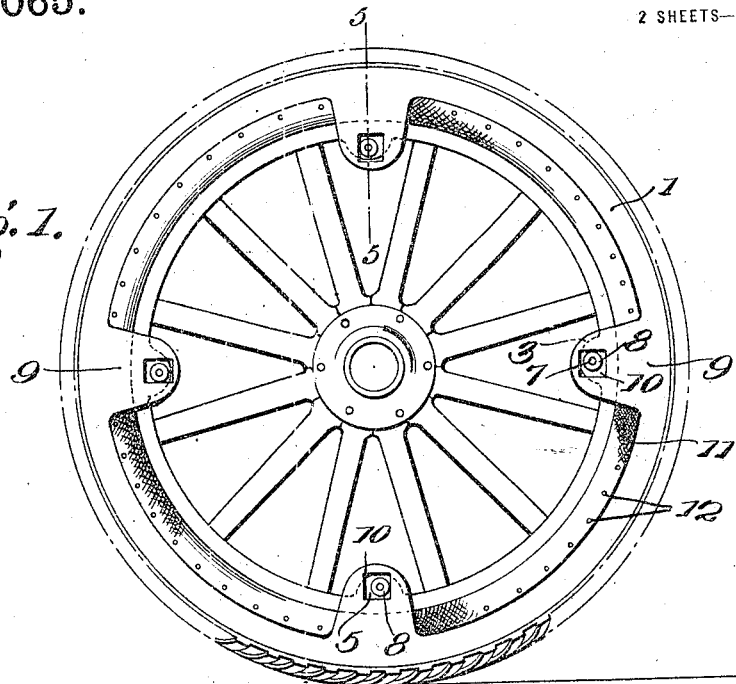

W. K. KIGHT.
TIRE ARMOR.
APPLICATION FILED JULY 10, 1913.

1,176,065.

Patented Mar. 21, 1916
2 SHEETS—SHEET 1.

Witnesses

Inventor
W. K. Kight.
By
Attorneys

W. K. KIGHT.
TIRE ARMOR.
APPLICATION FILED JULY 10, 1913.
1,176,065.
Patented Mar. 21, 1916.
2 SHEETS—SHEET 2.
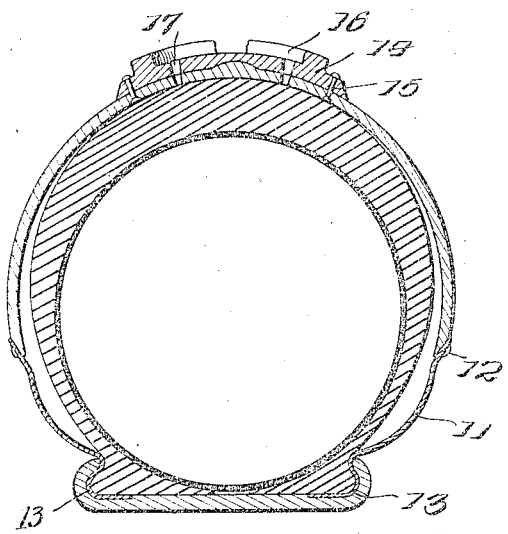
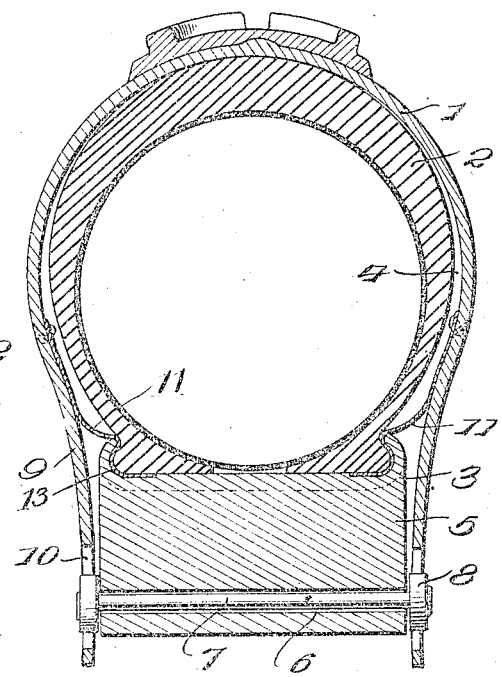
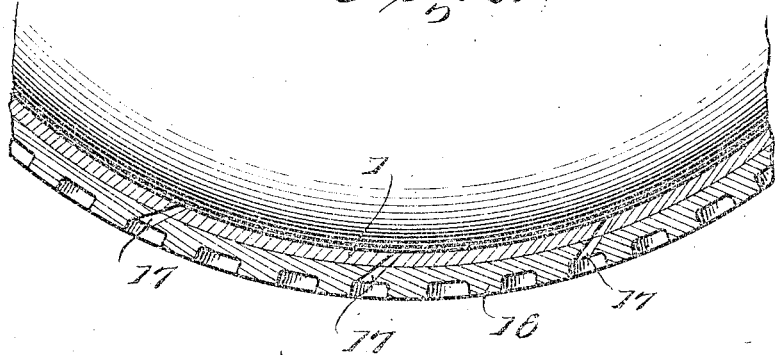
Witnesses
Inventor
W. K. Kight.
By
Attorneys

UNITED STATES PATENT OFFICE.

WILLIAM K. KIGHT, OF DEXTER, MISSOURI.

TIRE-ARMOR.

1,176,065.   Specification of Letters Patent.   Patented Mar. 21, 1916.

Application filed July 10, 1913. Serial No. 778,411.

*To all whom it may concern:*

Be it known that I, WILLIAM K. KIGHT, a citizen of the United States, residing at Dexter, in the county of Stoddard and State of Missouri, have invented certain new and useful Improvements in Tire-Armor, of which the following is a specification.

This invention relates to tire armor and has as its object to provide a protective armor which may be readily applied to any ordinary pneumatic tire and which when applied will prevent puncturing of the tire and wear of the tread thereof.

The armor may be constructed and adapted for application to bicycle tires, carriage tires and the tires of motorcycles as well as for application to automobile tires, although it is more particularly designed for this latter use.

Another aim of the invention is to so construct the armor that it will not have frictional contact with the tire or the tire casing to such degree as to cause undue heating of the tire or its casing, and in this connection the invention aims further to construct the armor in such a manner that a circulation of air within the armor and about the tire will be induced as successive portions of the tire are subjected to and relieved of pressure.

Another aim of the invention is to so form the armor that there will be no likelihood of the tire or its casing being cut by coming in contact with sharp edges, and in fact, the contour of the armor in cross section is such as to allow for complete spreading of the tire as successive portions are subjected to pressure.

Another aim of the invention is to provide against creeping of the armor upon the tire and in so doing to relieve the tire of the dragging force to which it is ordinarily subjected, especially when mounted upon one of the rear or traction wheels of an automobile.

Another object in view is to overcome the resistance usually offered to the travel of pneumatic tires over a road surface and occasioned by bunching of the tire tread immediately in advance of its portion which is in contact with the road surface. It is a well known fact that a pneumatic tire will bunch or that a ridge will form therein and be maintained, directly in advance of the portion of the tread which is in direct contact with the road surface and this ridge offers a constant resistance to the travel of the tire as will be understood. The present invention, therefore, aims to provide a tire armor which will permit of the usual yielding of the tire without, however, the formation of such a ridge, the yield being in an upward or rearward direction so that no undue resistance is offered to the tire as it passes over the road surface.

The invention also contemplates the provision of a removable tread which prevents undue wear of the body of the armor and which may be readily replaced when worn so as to prolong the life of the armor.

Figure 2:
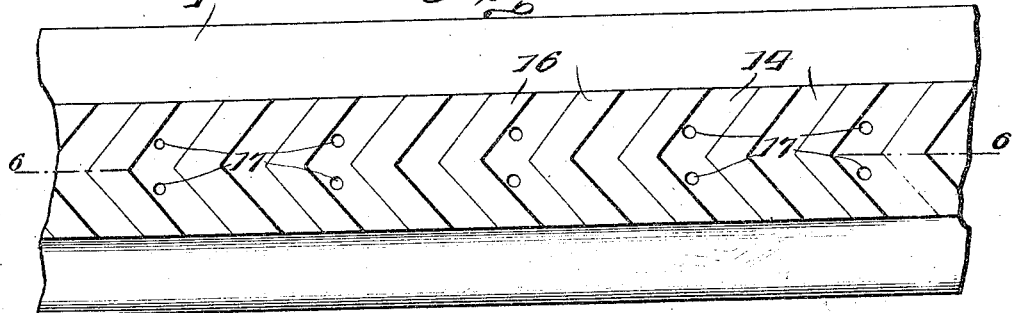
Figure 3:
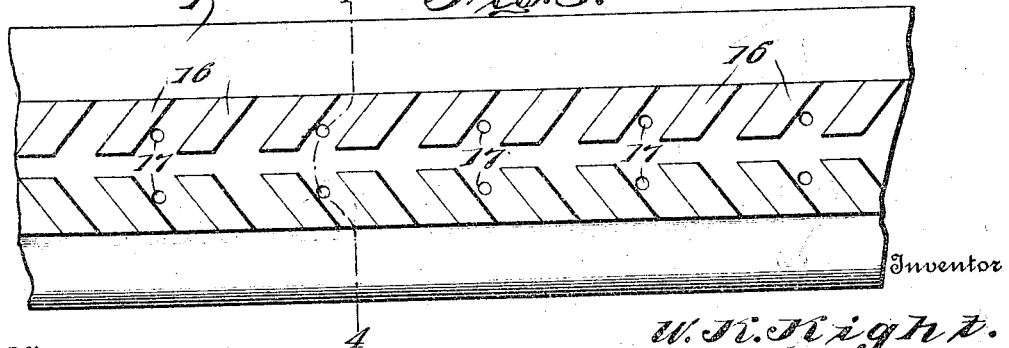

In the accompanying drawings: Figure 1 is a view in side elevation of the armor constructed in accordance with the present invention, the same being illustrated applied to a tire upon an automobile wheel. Fig. 2 is a plan view of a portion of the tread of the armor. Fig. 3 is a similar view illustrating a slight modification in the form of the tread surface. Fig. 4 is a transverse sectional view on the line 4—4 of Fig. 2. Fig. 5 is a similar view on the line 5—5 of Fig. 1. Fig. 6 is a longitudinal sectional view on the line 6—6 of Fig. 2.

Corresponding and like parts are referred to in the following description and indicated in all the views of the drawings by the same reference characters.

The armor embodying the present invention is in the form of an annular sheet metal body 1, which is integral throughout and of a diameter to fit snugly about the tread portion of the tire which it is to protect, the tire being indicated by the numeral 2 and the rim upon which it is mounted being indicated by the numeral 3. By reference to Figs. 4 and 5 of the drawings, it will be observed that the body 1 is transversely as well as annularly curved and that its transverse curvature is of less degree than the transverse curvature of the exterior surface of the tire. As a consequence the side portions of the body of the armor are spaced from the side portions of the tire 2, as indicated at 4, the purpose of so constructing and proportioning the parts being presently more fully pointed out. The rim 3 upon which the tire 2 is mounted is of channel-formation, as clearly shown in Figs. 4 and 5, and at equi-distantly spaced points, it is formed with lugs 5 which project radially inwardly, as clearly shown in Fig. 1 and each of which is formed with a transversely extending opening 6. A pin or spindle 7 is fitted in the opening 6 in each lug 5 and upon the ends of each spindle are fitted rollers 8 which lie beside the side faces of the respective boss. At correspondingly spaced intervals, the sides of the body 1 of the tire armor are formed with inwardly radially projecting ears 9 each formed with a substantially rectangular aperture 10, against the walls of which the rollers 8 are designed to work.

In Fig. 1 of the drawings, the armor is illustrated as provided with four sets of the ears 9 but it will be readily understood that a greater or less number of sets may be employed if found necessary. It will also be apparent, by reference to the said figure, that when the wheel is rotated in the direction indicated by the arrow, the rollers indicated by the numerals 8ª and 8ᵇ will contact respectively with the forward wall of the opening in the uppermost one of the ears 9 and the lower wall of the opening in the foremost one. By reason of such engagement of the rollers against the walls of the apertures in the ears, traction force is applied directly to the tire armor and the tire is relieved of the dragging force to which it is subjected when allowed to contact directly with the road surface. It will be further observed from an inspection of the said Fig. 1, that the other rollers 8 are normally out of contact with the walls of the openings in which they are arranged to play, so that when the tire is subjected to pressure or to sudden impact, the armor may yield upwardly and rearwardly with respect to the direction in which the tire is traveling without, however, in any way disturbing the engagement of the rollers 8ª and 8ᵇ or the other rollers when occupying the position assumed by these rollers in Fig. 1, or approximate positions, against the walls of openings in the respective or similarly located ears 9. Furthermore, it will be apparent that due to the character of the armor and the manner in which it is arranged on the tire, the armor and tire yield in a direction to most effectually cushion the wheel and the vehicle body supported thereby and consequently, the wheel meets with less resistance when it contacts with ruts or stones in the road surface than would otherwise be the case. At this point it is to be noted that due to the fact that the transverse curvature of the body 1 is of less degree than that of the exterior surface of the tire 2, the tire may flatten or expand when pressure is applied to the wheel, the space 4 allowing for such change in the contour of the tire and this change may take place without likelihood of the tire coming in contact with the edges of the side portions of the said body 1.

In order to exclude dust and dirt from the interior of the armor, flexible annular dust guard sheets 11 are provided and are secured at their outer edges as at 12 to the edges of the side portions of the body 1 and at their inner edge portions are fitted as at 13 between the inner side of the tire casing 2 and the walls of the channel in the rim 3. These sheets are, of course, normally sagged, as shown in Fig. 4 to allow for floating of the armor.

The body 1 of the armor is provided with a tread consisting of an annular transversely curved body member 14 which is riveted or otherwise secured as at 15 at its edge portions to the tread surface of the body 1 in the manner shown in Figs. 4 and 5 and which is provided with a circumferentially extending series of a ⁴ skidding ribs 16, which, as shown in Fig. 2 of the drawings, are of V-shape and as shown in Fig. 3 may be separate or disconnected but arranged at an angle with respect to each other, substantially as in the said Fig. 2. It will of course, be understood that these anti-skidding ribs provide for a more effectual contact of the armor with the road surface, as well as preventing skidding of the wheels. Furthermore, they serve to destroy suction force which is present beneath the tread of a pneumatic tire when traveling directly upon the road surface and which force, of course, offers resistance to the travel of the wheel over such surface. It will be understood, of course, that the tread 14 serves effectually to prevent wear of the tread portion of the body 1 of the armor and that when it itself becomes worn it may be readily removed and a new tread portion substituted therefor. As before stated, the invention aims to provide against such frictional contact of the armor with the tire as will unduly heat the tire and thereby deteriorate the rubber of which it is composed and to this end the tread 14 and the tread portion of the body 1 are formed at intervals and between the ribs 16 with air passages 17 which are gradually increased in diameter from their inner to their outer ends, or in other words, from their ends which communicate with the interior of the body 1 to their ends which open at the outer surface of the tread 14. As concerns this feature of the invention, it will be readily understood that when the tire is compressed and expanded so as to practically close and fill the spaces 4 a greater or less volume of the air will be forced through the opening 17 and consequently expel from the body 1, and it will further be apparent that as the tire assumes its normal shape a greater or less volume of air will be drawn in by the suction force created through the said openings and will be caused to circulate about the tire. By increasing the diameter of the openings in the direction of their outer ends, dust and dirt is prevented from lodging therein. It will be observed by reference to Fig. 6, that the openings do not extend radially but extend on lines which are chords of the circle described by the tread. This inclination of the openings further serves to prevent clogging thereof, inasmuch as each opening as it reaches a position where its open end meets the surface of the road, is inclined upwardly and rearwardly from the road surface and this angle of inclination increases as the wheel revolves. Furthermore, inasmuch as the openings are inclined or extend at an angle away from the direction of rotation of the wheel, a suction force is exerted to a greater or less degree as the wheel is rapidly rotating which, of course, aids in creating a circulation of air within the armor and about the tire.

Having thus described the invention what is claimed as new is:

In combination, a rim provided at intervals with inwardly extending lugs, a tire fitted to the rim, a metallic protector encircling the tire and having its side portions extending along the sides of the tire and spaced therefrom, flexible bands spanning the spaces between the edges of the protector and rim and attached to each and having a fullness between their edges, opposed ears extending inward from the edges of the protector and arranged exterior to the flexible bands and extending along opposite sides of the lugs of the rim and having openings in their end portions, pins supported in the lugs with their ends projecting, and rollers mounted upon the projecting ends of the pins and arranged in the openings of the ears.

In testimony whereof I affix my signature in presence of two witnesses.

WILLIAM K. KIGHT. [L. S.]

Witnesses:
HENRY W. KERSTNER,
WILLIAM T. DUGAN.